United States Patent
Rayasam Venkatasubbaiah et al.

(10) Patent No.: US 8,250,276 B2
(45) Date of Patent: Aug. 21, 2012

(54) ONLINE DELETION OF DEVICES

(75) Inventors: Suresh Rayasam Venkatasubbaiah, Karnataka (IN); Anand Ananthabhotla, San Jose, CA (US); Ajitkumar Asikkadu Natarajan, Campbell, CA (US); Chethan Seshadri, Karnataka (IN); Satheesh Kumar Nanniyur Krishnamoorthy, Santa Clara, CA (US); Nadathur Srinivasan Sundar, Cupertino, CA (US); Paulose Kuriakose Arackal, Cochin (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1236 days.

(21) Appl. No.: 11/870,151

(22) Filed: Oct. 10, 2007

(65) Prior Publication Data

US 2008/0256559 A1    Oct. 16, 2008

(30) Foreign Application Priority Data

Oct. 10, 2006   (IN) .......................... 1874/CHE/2006

(51) Int. Cl.
*G06F 13/00* (2006.01)
*G06F 1/32* (2006.01)

(52) U.S. Cl. .................. 710/302; 713/323; 713/324

(58) Field of Classification Search .................. 710/104, 710/302; 713/323, 324
See application file for complete search history.

(56) References Cited

U.S. PATENT DOCUMENTS

| | | | |
|---|---|---|---|
| 6,216,188 B1 * | 4/2001 | Endo et al. ................... 710/302 |
| 6,311,242 B1 * | 10/2001 | Falkenburg et al. .......... 710/301 |
| 6,807,596 B2 * | 10/2004 | Erickson et al. .............. 710/301 |
| 7,200,694 B2 * | 4/2007 | Yakovlev et al. ............... 710/48 |
| 7,216,192 B2 * | 5/2007 | Boulay et al. ................. 710/302 |
| 7,698,472 B2 * | 4/2010 | Robbin et al. ................... 710/17 |
| 2003/0167367 A1 * | 9/2003 | Kaushik et al. ............... 710/302 |
| 2004/0019710 A1 * | 1/2004 | Kolli et al. ...................... 710/19 |
| 2006/0069835 A1 * | 3/2006 | Arackal et al. ................ 710/302 |
| 2007/0156942 A1 * | 7/2007 | Gough ........................... 710/302 |

OTHER PUBLICATIONS

Budruk, Ravi; Anderson, Don; and Shanley, Tom; PCI Express System Architecture; Mindshare, Inc.; 2004; pp. 658-661.*

* cited by examiner

*Primary Examiner* — Glenn A Auve

(57) ABSTRACT

An I/O adapter is installed in a slot in a computer system. Online deletion of the I/O adapter is achieved by a three step process, in which a device driver that controls the adapter first attempts to quiesce the adapter, the slot is then powered off, if it is possible to do so, and finally, if the quiesce operation was successful or the slot is powered off, the driver completes the delete operation by unmapping buffers and cleaning up datastructures associated with the device driver.

5 Claims, 4 Drawing Sheets

ONLINE DELETION OF DEVICES

RELATED APPLICATIONS

The present application is based on, and claims priority from, Indian Patent Application Number 1874/CHE/2006, filed on Oct. 10, 2006, the disclosure of which is hereby incorporated by reference herein in its entirety.

FIELD OF THE INVENTION

The present invention relates to computer systems, particularly but not exclusively to online deletion of devices such as I/O adapters.

BACKGROUND

Many computer systems, such as enterprise servers, support critical processes that should continue to operate despite faults and sub-system failures. Such systems cannot therefore be switched off when devices require removal or replacement. Moreover, removal of a device has the potential to cause damage to the system, unless it is carefully handled. The process of safely removing a device without switching off the system is known as online deletion.

Online deletion of I/O adapters has traditionally been implemented as a single step operation where the device driver attempts to disable the components in the adapter or render them inactive, an operation that is referred to herein as quiescing the adapter. If the quiesce operation fails, the online deletion operation fails. The quiesce operation may fail because one or more components in the adapter do not support the quiesce operation, because the operation returns a 'failed' status, or because the return status of the quiesce operation is unknown.

If the quiesce operation fails, then one or more components of the adapter may continue to initiate direct memory access (DMA) operations. Furthermore, if clean up/deallocation of datastructures or unmapping of DMA buffers is attempted as part of the online deletion operation, and one or more components of the adapter were unsuccessfully quiesced, then a subsequent DMA by the unsuccessfully quiesced components of the adapter will result in a 'machine check' condition, that generally prevents further operation of the system.

SUMMARY OF THE INVENTION

The present invention aims to address the above problems.

According to the invention, there is provided a method of online deletion of a device received in a connector in a computer system, the method comprising initiating a delete operation by initiating an operation to quiesce the device, if the connector is capable of being powered off, powering off the connector and in the event that either the quiesce operation succeeds or the connector is powered off, completing the delete operation.

The connector may comprise an internal or external slot or socket or a connection between a core I/O component and a system board.

A three step online deletion operation according to the invention increases the probability of successfully completing the deletion operation even if the device is not behaving correctly or its programming model, which is the specification of interfaces through which a device driver controls and manages a device, does not provide sufficient mechanisms to manage online deletion.

Since the power-off phase of the operation occurs before completion of the delete operation, online deletion of the device can succeed even if the quiesce operation has failed.

Initiation of the delete operation results in suspension of the operating system state of the device, so that, for example, probe events are no longer sent to it from the device driver to determine if the device exists and is functional.

After the deletion step, all runtime information relating to the device is removed from the operating system, and the operating system no longer keeps track of the device status.

The quiesce status can be stored during the initial deletion phase, so enabling a determination of whether or not to fail the online delete operation for slots without individual power controls.

The device may include one or more direct memory access (DMA) engines for performing DMA transfers, and the step of quiescing the device may comprise stopping the DMA engines.

The step of completing the delete operation may comprise unmapping DMA buffers associated with the device, and cleaning up or deallocating datastructures associated with the device driver.

The delete operation may be terminated if the operation to power-off the slot fails.

According to the invention, there is further provided a computer system comprising a device received in a connector and means for performing online deletion of the device, the deletion means comprising means for initiating a delete operation, said means being operative to attempt to quiesce the device, means for determining if the connector can be powered off and, if the connector can be powered off, means for powering the connector off, and means for completing the delete operation in the event that either the quiesce operation succeeds or the connector is powered off.

The device may comprise one or more input/output (I/O) components, which may together comprise an I/O adapter.

According to the invention, there is further provided a system for performing online deletion of a device received in a connector in a computer system, the system comprising a device driver for controlling the device, deletion control software arranged to initiate a delete operation by instructing the device driver to quiesce the device and a power control module for powering the connector down, if the connector is capable of being powered down, wherein the deletion control software is arranged to instruct the device driver to attempt to complete the delete operation, wherein the device driver is configured to complete the delete operation in the event that either the quiesce operation succeeded or the connector was powered down.

The device driver may be configured to determine whether the quiesce operation succeeded and whether the connector was powered down.

According to the invention, there is further provided a computer program for controlling online deletion of a device received in a connector in a computer system, the program comprising means for instructing a device driver to attempt to quiesce the device, means for instructing a power control circuit associated with the connector to power off the connector, if the connector is capable of being powered off, and means for instructing the device driver to attempt to complete the delete operation based on the outcome of the attempt to quiesce the device and the power off status of the connector.

The device driver may be configured to complete the delete operation in the event that either the quiesce operation succeeded or the connector was powered off.

DETAILED DESCRIPTION

Figure 1:
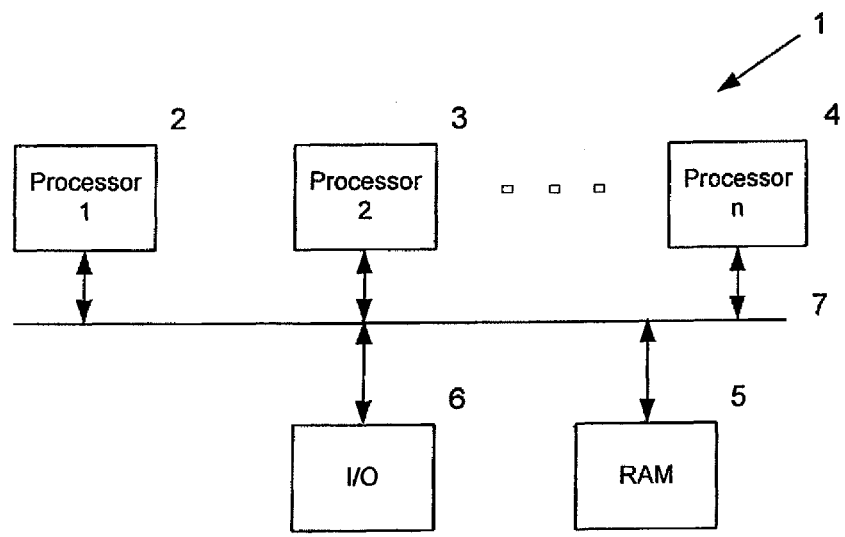
FIG. 1 is a schematic diagram of a conventional multiprocessor system.

FIG. 1 is an example schematic diagram of a conventional symmetric multiprocessor system 1 comprising a plurality of processors 2, 3, 4, main memory 5, for example in the form of dynamic RAM and an Input/Output (I/O) system 6, all interconnected by a bus 7. It will be understood that this is one example of a computer system configuration and that the invention could be used with this and with many other system configurations.

Figure 2:
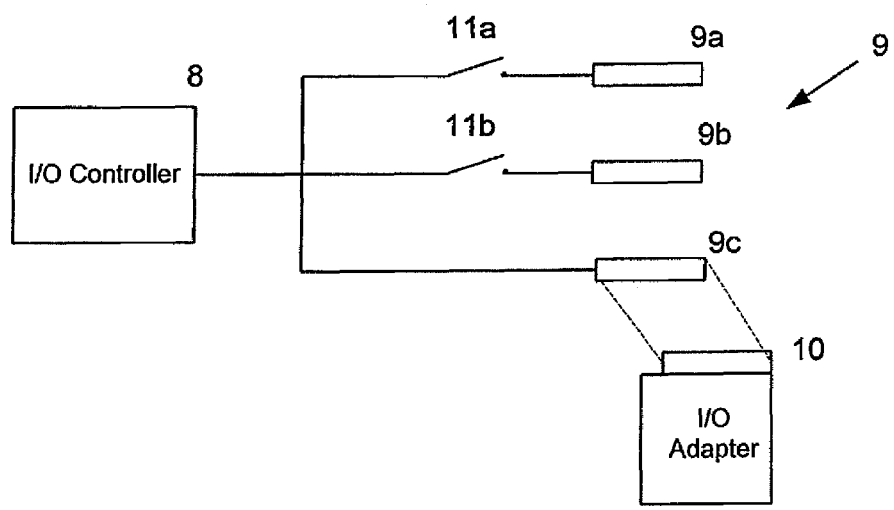
FIG. 2 is a more detailed example of the I/O system shown in FIG. 1.

FIG. 2 illustrates an I/O system controller 8 that is part of the I/O system 6 shown in FIG. 1. The I/O system controller 8 is connected to a number of I/O slots 9 for receiving I/O adapters 10, for example, PCI slots for receiving PCI cards. The slots 9, also referred to as sockets or connectors, are the electrical interface that provides power and control/data signals for an I/O adapter. First and second slots 9a, 9b are, for example, each associated with an individual power control circuit 11a, 11b for switching the respective slots on and off. A third slot 9c does not have an individual power control circuit.

An I/O adapter is a printed circuit board (PCB) that includes one or more I/O components, also referred to as I/O functions. For example, a two-port Fibre Channel adapter has two Fibre Channel I/O components on the same PCB. Each I/O component provides an interface between the computer system and an I/O technology. For example, a Fibre Channel I/O component provides an interface between the computer and a Fibre Channel Storage Area Network.

Figure 3:
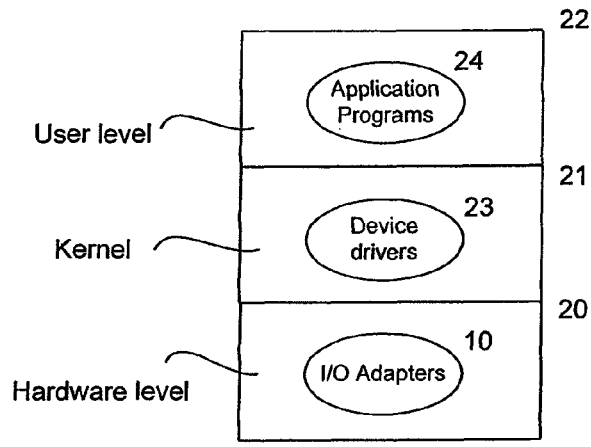
FIG. 3 is a high-level overview of a computer system illustrating the interrelationship between software and hardware.

FIG. 3 is a high-level overview of a computer system illustrating the interrelationship between software and hardware. The system includes a hardware level 20 that includes the I/O adapters 10, a kernel 21 and a user level 22. The kernel 21 is the part of the operating system of the computer that controls the hardware and includes device driver software 23 for controlling the I/O components in the I/O adapters. The user level 22 includes the application programs 24 that are being run on the computer, that communicate with the I/O components in the I/O adapters via the device drivers 23.

Figure 4:
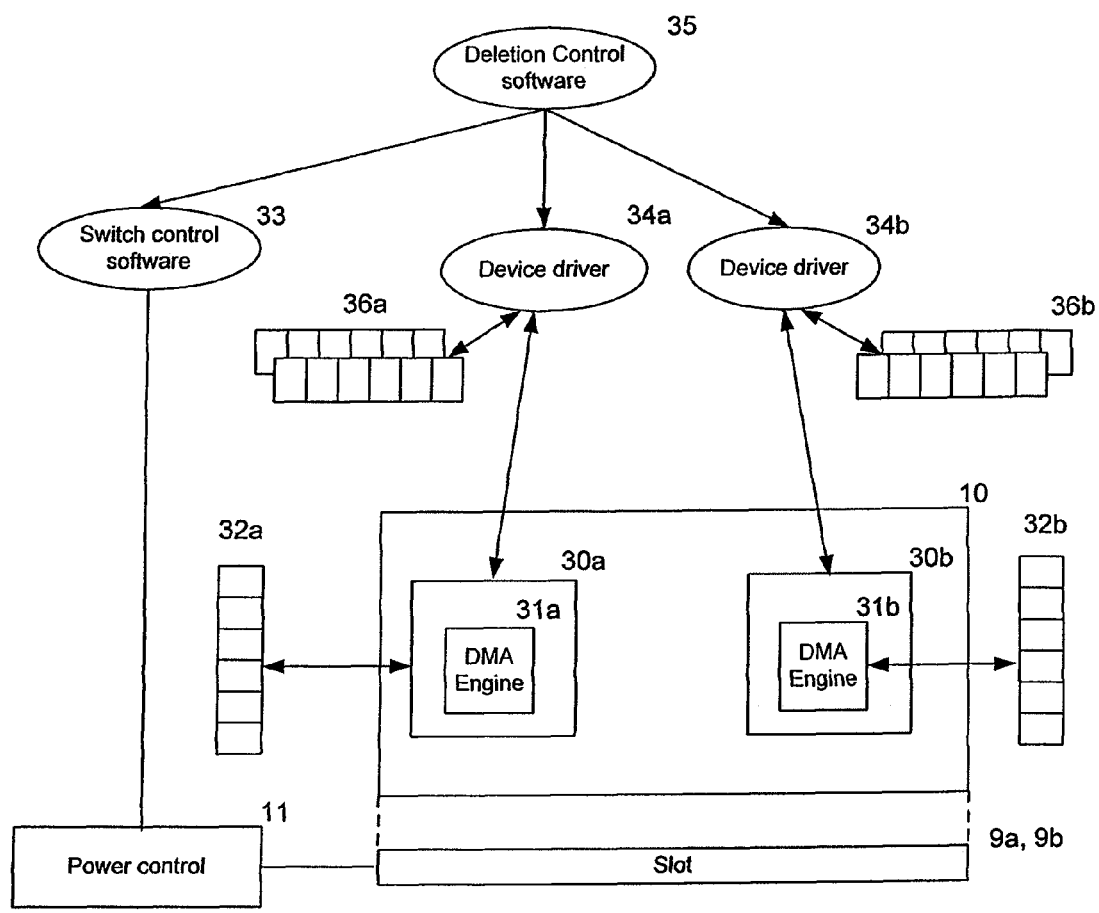
FIG. 4 is a schematic diagram illustrating a system according to the invention.

FIG. 4 is a schematic diagram illustrating a system according to the invention. Each adapter 10 comprises one or more I/O components 30a, 30b, each of which has one or more Direct Memory Access (DMA) engine(s) 31a, 31b. The DMA engine 31a, 31b is a subsystem that manages and controls the component's DMA operations. DMA is a technique that allows an I/O component to access the main memory 5 without involving the processor 2, 3, 4. A DMA buffer 32a, 32b is a block of memory 5 that serves as the source or target of a DMA operation.

Switch control software 33 controls the switch 11. I/O components 30a, 30b in the I/O adapter 10 are controlled by their respective device drivers 34a, 34b. A device driver comprises software within the operating system that controls one or more I/O components of the computer. The overall control of the online deletion operation is managed by online deletion software 35, also referred to herein as deletion control software, that manages the switch control software 33 and the device drivers 34a, 34b.

A device driver tracks information corresponding to a single I/O component in a set of instance datastructures 36a, 36b. A datastructure is a block of memory 5 storing data in a predefined format.

In another example of the invention, a single device driver controls all of the components on the adapter. For example, in the case of a multiport adapter, such as a 2-port fibre channel adapter, one device driver controls all ports, using one set of instance datastructures per port.

Figure 5:
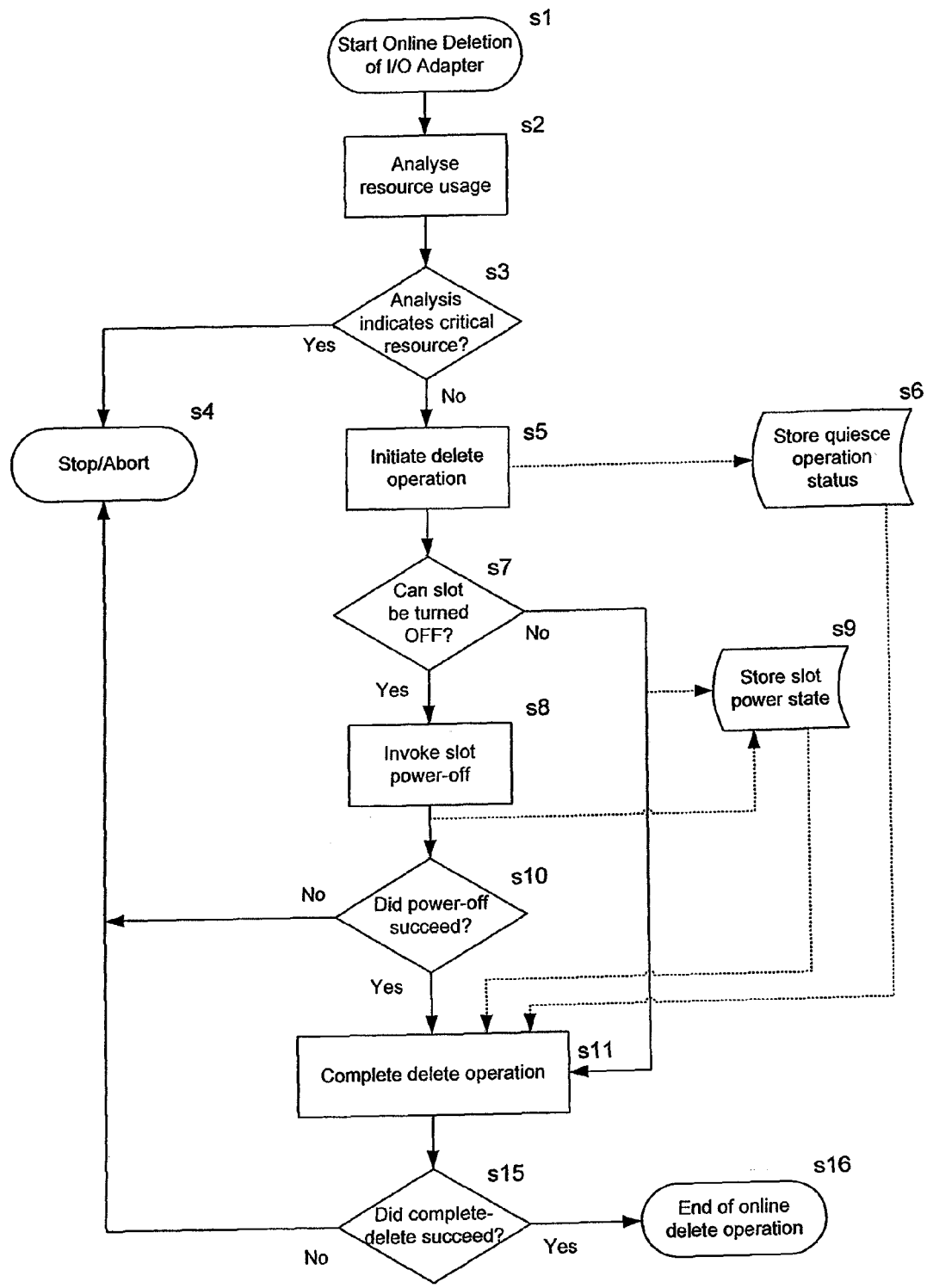
FIG. 5 is a flowchart illustrating an online deletion operation according to the invention.

FIG. 5 is a flowchart illustrating an online deletion operation according to the invention.

On initiation of the online deletion operation (step s1), for example in response to a user entered command, the deletion control software 35 first analyses resource usage, for example to determine if any component of the target adapter is a critical resource (step s2). A critical resource is one that would cause a system malfunction or crash or an application malfunction if it is suspended, rendered inactive or removed.

If the critical resource analysis indicates that a component is a critical resource (step s3), then the operation is stopped (step s4). If the critical resource analysis indicates that a component is not a critical resource, the next step is to initiate the delete operation. This involves the deletion control software 35 informing the device drivers 34a, 34b of the upcoming delete event and instructing them to quiesce the I/O components (step s5). This involves the device drivers 34a, 34b stopping the DMA engines 31a, 31b of each I/O component. The status of the quiesce operation is stored internally for subsequent use (step s6). After this phase, the device drivers 34a, 34b will not initiate any transaction that targets the I/O components on the adapter in the affected slot. This means that the slot hosting the adapter can be powered off without side effects.

The next phase is the power-off phase. The deletion control software 35 determines whether the slot can physically be powered-off, for example, whether there is a power control circuit 11a, 11b associated with the slot (step s7). If the slot can be powered-off, the deletion control software 35 instructs the switch control software 33 to power off the slot 9a, 9b (step s8). The slot power state is stored internally (step s9). The deletion control software 35 then determines whether the power-off operation succeeded (step s10). If not, the delete operation is aborted (step s4). If it succeeded, the deletion control software 35 initiates the final phase of the delete operation (step s11). If the slot cannot physically be powered-off, then the slot power state is stored internally (as 'ON') (step s9), steps s8 and s10 are omitted and control passes straight to the final phase (step s11).

Figure 6:
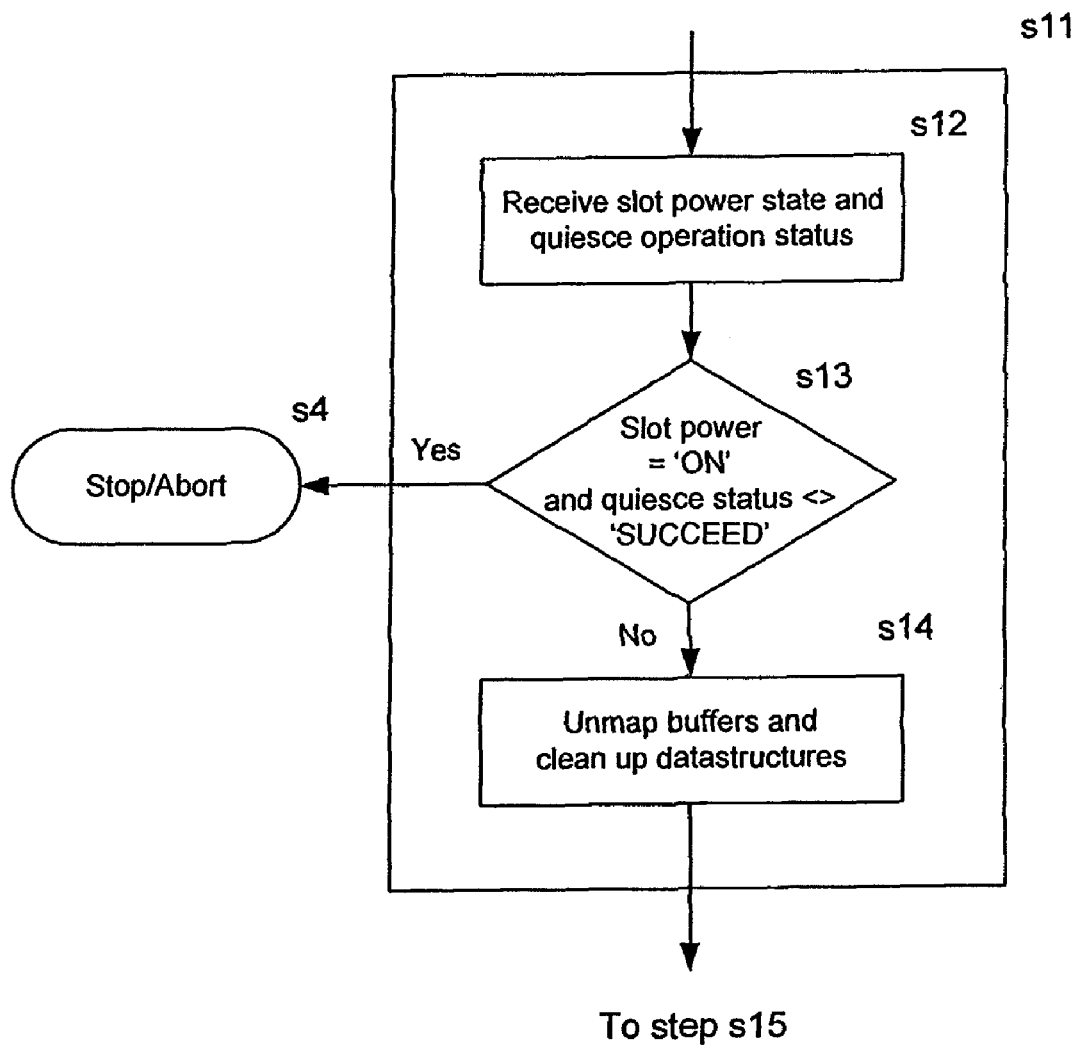
FIG. 6 is a flowchart illustrating the completion of the online deletion operation shown in FIG. 5.

In the final phase, illustrated in FIG. 6, the device drivers 34a, 34b receive information concerning the power status of the slot and the quiesce operation status (step s12) and complete the deletion operation by executing the following algorithm:

```
IF (slot power is 'ON') AND
    (quiesce status is not equal to 'SUCCEED') THEN
        Fail delete operation and return
ELSE
    Complete delete operation
```

Step s13 shows the first part of this algorithm. If the slot power is on and the quiesce operation did not succeed, then the delete operation aborts (step s4). The quiesce operation is deemed not to have succeeded either if it has failed or if the quiesce status is unknown. If either the slot power has been turned off, or the quiesce operation succeeded, then the delete operation can be completed. The step of completing the delete operation (step s14) comprises unmapping the DMA buffers 32*a*, 32*b* and cleaning up/deallocating the datastructures 36*a*, 36*b* associated with the affected I/O components. Cleanup involves deallocating embedded datastructures within the instance datastructures and informing other subsystems within the operating system that the instance is being deallocated. Deallocation of the instance data structures follows. Data structures can be removed since the above procedure guarantees that the adapter cannot initiate a DMA operation.

Finally, referring again to FIG. 5, the deletion control software 35 determines whether the delete operation has completed successfully (step s15). If not, the procedure aborts (step s4). Otherwise, the procedure terminates successfully (step s16).

Other embodiments or modifications to the above embodiments falling within the scope of the appended claims would be apparent to the skilled person. For example, while the device drivers have been described as being part of the kernel, the invention can also be implemented by user mode drivers.

The invention claimed is:

1. A method of online deletion of a device received in a connector in a computer system, the method comprising:
- initiating a delete operation by initiating an operation to quiesce the device;
- if the connector is capable of being powered off, powering off the connector;
- in the event that either the quiesce operation succeeds or the connector is powered off, completing the delete operation; and
- storing a status of the quiesce operation;
- wherein the device includes a direct memory access (DMA) engine for performing DMA transfers, and the step of quiescing the device comprises stopping a DMA engine.

2. A method according to claim 1, wherein the step of completing the delete operation comprises unmapping DMA buffers associated with the device.

3. A method according to claim 1, wherein the device is controlled by a device driver, and wherein the step of completing the delete operation comprises cleaning up data structures associated with the device driver.

4. A method according to claim 1, comprising storing a power state of the connector.

5. A method of online deletion of a device received in a connector in a computer system, the method comprising:
- initiating a delete operation by initiating an operation to quiesce the device;
- if the connector is capable of being powered off, powering off the connector;
- in the event that either the quiesce operation succeeds or the connector is powered off, completing the delete operation;
- storing a status of the quiesce operation, and
- terminating the delete operation if the power-off fails.

* * * * *